Sept. 13, 1960 C. SCHNELL 2,952,288
COMMINUTING MACHINE
Filed Aug. 2, 1957 3 Sheets-Sheet 1

Inventor
Carl Schnell

Sept. 13, 1960 C. SCHNELL 2,952,288
COMMINUTING MACHINE
Filed Aug. 2, 1957 3 Sheets-Sheet 2

Inventor
Carl Schnell

Sept. 13, 1960 — C. SCHNELL — 2,952,288
COMMINUTING MACHINE
Filed Aug. 2, 1957 — 3 Sheets-Sheet 3

Inventor
Carl Schnell

United States Patent Office 2,952,288
Patented Sept. 13, 1960

2,952,288

COMMINUTING MACHINE

Carl Schnell, Winterbach near Schorndorf, Wurttemberg, Germany, assignor of one-half to The Griffith Laboratories, Inc., Chicago, Ill., a corporation of Illinois Filed Aug. 2, 1957, Ser. No. 676,000

2 Claims. (Cl. 146—192)

The present invention relates to centrifugal comminuting machines and more particularly to one for comminuting meat for use in sausage and like products.

The present application is a continuation-in-part of my U.S. application Serial No. 572,543, filed March 19, 1956, now U.S. Patent No. 2,840,318, issued June 24, 1958, and a continuation-in-part of Serial No. 615,074, now abandoned and filed October 10, 1956 as a continuation-in-part of said Serial No. 572,543.

The machines described in said original and later-filed applications are useful for comminuting many materials, especially agricultural products including meat and animal products for preparing sausage and other comminuted meat products. When such machines are used for comminuting animal products, special precautions are necessary, and these bear upon the construction and operation of the machine.

For most purposes raw meat material must be comminuted under conditions to avoid heating it. It is best when discharged substantially free from entrapped air. It must be comminuted at a high rate of feed and discharge.

The fineness of comminuting is controlled by selecting from a supply of removable perforated plates, one with relatively small or large holes for relatively fine or coarse products. In the case of fine grinding, the meat commonly mixed with cold water or ice for the desired meat formulation, may be discharged as an emulsion, the fat being emulsified by protein, of which lean meat and raw animal skin are examples.

Animal skin presents difficulties in comminuting because of its toughness. Heretofore, it has been cooked to ease the work of comminuting. By the structure and operation of the improved machine of the present disclosure the work, and hence the heat generated, in comminuting raw animal skin is greatly lessened, and a resulting emulsion is relatively free of air bubbles.

The present invention pertains to centrifugal comminuters or grinders, as distinguished from the auger-fed meat choppers and grinders, which also have perforated plates and cutters, but which operate at relatively slower speeds at which the augers are effective to feed meat to the cutters. In centrifugal comminuting machines the cutters have the additional functions of propelling the material through the perforated plate, and of mixing the various fed components.

Centrifugal machines of the type to which the present invention is applicable have a substantially unencumbered supply chamber into which material to be comminuted is constantly fed and thoroughly mixed, in which chamber the cutters rotate at high-speed over and against a perforated discharge plate. An inherent result is rapid circulation and mixing of material by the cutters, involving flow to the periphery as in centrifugal pump action. This circulation and flow generates heat, which in the case of meat products may adversely affect the quality of the discharged material.

The quicker the meat is cut to size for discharge through the selected plate, the less the time it is present in the chamber to be heated by circulation and friction. Dull cutters prolong the time for comminution and hence increase the heating.

The present invention aims to provide a centrifugal comminuting machine particularly useful for continuously producing comminuted meat at a high rate of production without damage to the meat by heat of friction in passing through the machine.

The general use of the machine calls for periodic removal of the cutters for sharpening, and periodic change of perforated plates for effecting various degrees of fineness.

It is one object of the present invention to facilitate mounting and removing the knives.

It is a particular object to provide a readily removable rotor of which the knives are parts, in which rotor, when removed, the knives may be replaced when desired.

Another object of the invention is to facilitate changing plates, by a simple operation involving only the simple removal of the cutting rotor.

The foregoing and other and ancillary objects and advantages of the invention will become apparent from the following description and explanation of the improved machine and the invention thereof, as shown in connection with the accompanying drawings in which.

Machines of the type described preferably have means to remove from the machine the material discharged through the perforated plate. Commonly, this is a centrifugal pump or throw-out rotor having radial vanes or other members which hurl the discharged material to the periphery of a discharge housing with a resulting generation of pressure effective to force it out through a nozzle or other small orifice. For this reason a powered shaft which carries the cutters is also used for the throw-out rotor, and as a result the powered shaft or parts carried thereby pass through the perforated plate. However, it is to be understood that separate shafts for the rotary cutters and for the throw-out rotor may be employed, and no rotary member need pass through the plate which carries the perforations.

Figure 1:
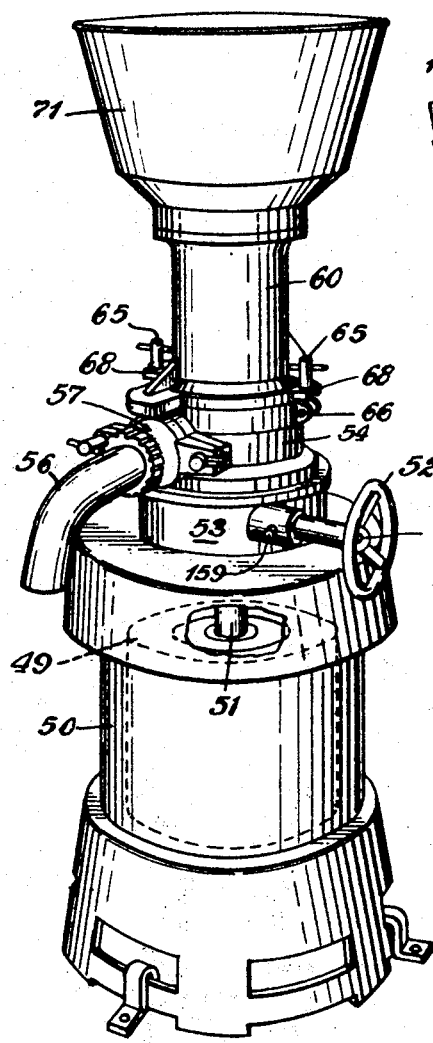
Fig. 1 is a perspective view of a machine as used.
Figure 4:
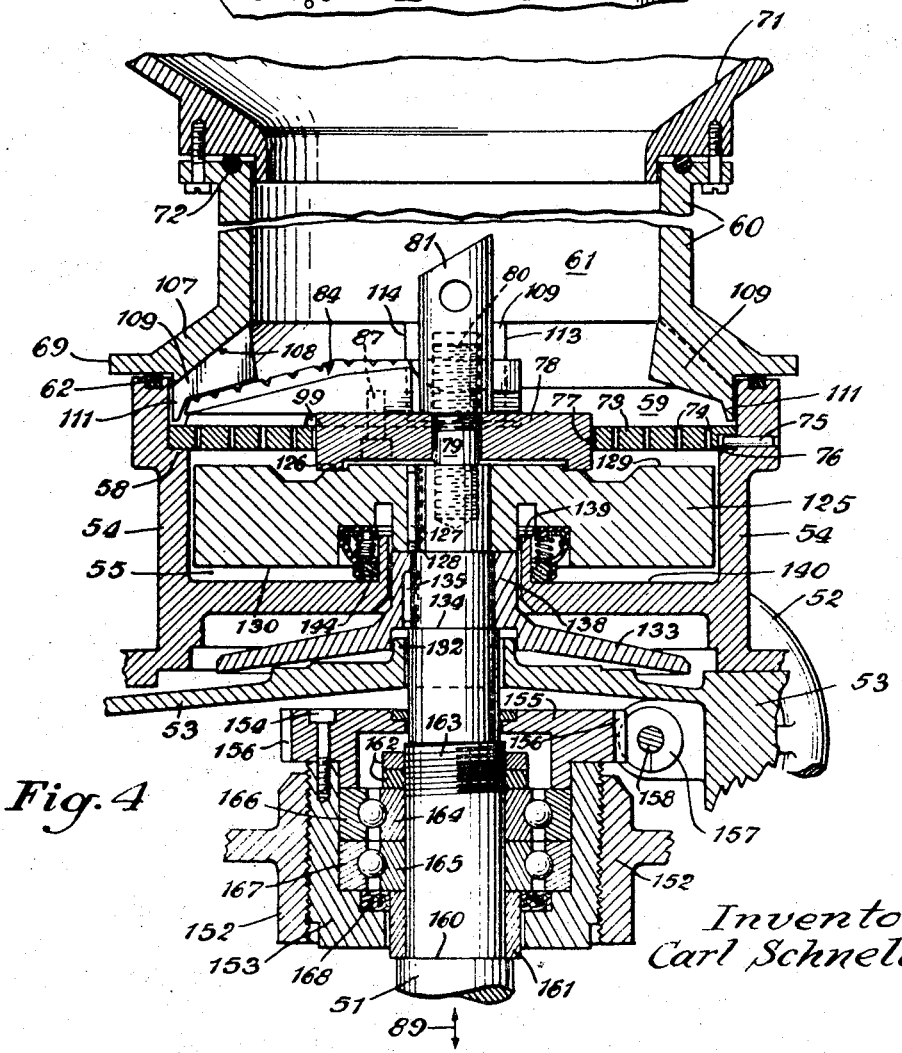
Fig. 4 is a cross-section through the perforated disk and portions of the housings above and below it taken on line A—A of Fig. 3 in the direction of the arrows.

In Fig. 1 is shown a general view of a machine embodying the present invention. It has a base 50 in which is fixed a powerful electric motor with casing 49 and vertical motor shaft 51 (Fig. 4), which shaft may be raised and lowered relative to casing 49 by turning a handwheel 52 by mechanism (later described) within the section 53. Housing 54 has a pump chamber 55 containing a throw-out rotor (later described) which forces material out the spout 56 from a tangential outlet 57. The upper part of the housing 54 has an internal shoulder 58 (Fig. 4) for supporting a removable plate above which, housing 54 provides a cylindrical cutting chamber 59. Above the housing 54 is a housing 60 providing supply chamber 61. Housing 60 fits tightly over housing 54 with a packing ring 62 (Fig. 4). The housing 60 is hinged at 63 (Fig. 2) to housing 54 so as to be swung away in a vertical arc. Swinging bolts 64 with hand nuts 65, hinged at 66 fit into radial slots 67 in lugs 68 which extend from a bottom flange 69 of the housing 60. The top of supply chamber 61 is extended by a flaring filling funnel 71 (Fig. 1) having a tight seal against packing 72 (Fig. 4).

Fig. 4 shows a selected plate 73 with perforations 74 resting on shoulder 58 and thus forming the bottom of cutting chamber 59. A shear pin 75 through the wall of the housing 54 into a hole 76 in the plate holds the plate from turning except when the pin may shear in some emergency condition for which purpose the pin is made suitably small.

When the power shaft 51 rises from the motor in the base 50, the plate 73 has a cylindrical-walled central opening 77 in which is located with a minimum of clearance for free running a cylindrical cutter-head or knife-holder 78, removably mounted with a slip-fit over stud 79 at the end of power shaft 51. The stud 79 is threaded into the end of shaft 51 and provides a threaded extension 80 of the shaft for receipt of a tightening nut 81 which compresses knife-holder 78 between it and a throw-out rotor on shaft 51, later described.

Figure 5:
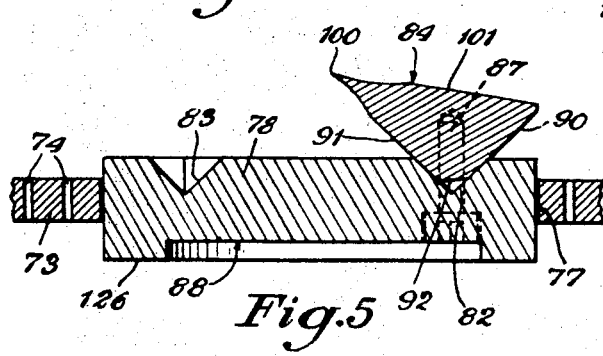
Fig. 5 is a cross-section of a detail of a cutter taken on line B—B of Fig. 3 in the direction of the arrows.
Figure 3:
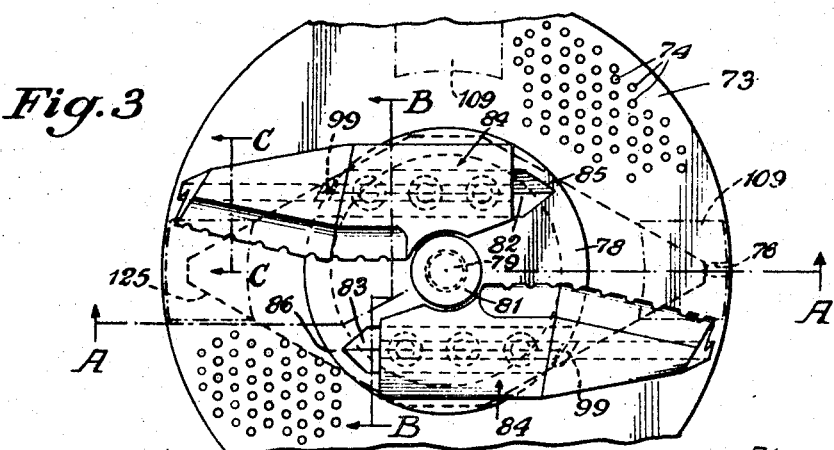
Fig. 3 is a top plan view of the cutters and of a perforated disk looking down upon such elements as shown in Fig. 4.

Figs. 3 and 5 show the knife-holder 78 with two parallel grooves 82 and 83 therein in one end of each of which is mounted a cutter 84. The other ends are preferably closed as shown at 85 and 86. The cutter 84 has a suitable cross-section (Fig. 5) to fit a groove 82 or 83 of which the contour may vary from that shown. Bolts 87 entered through holes in the underside 88 of the cutter-head 78 thread into openings therefor in the cutter 84 to hold it tightly in its groove and to position it properly.

Figure 6:
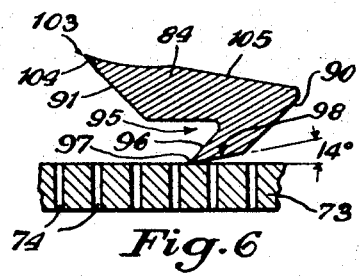
Fig. 6 is a cross-section through the same cutter taken on line C—C of Fig. 3 in the direction of the arrows, showing also its relation to the perforated plate.

As shown in Fig. 3 there are two cutters 84 extending in opposite directions as mounted in said two grooves. The cutters are substantially identical when new, and as sharpened, and are so mounted that they each rotate counter-clockwise in Fig. 3, between bounding planes at right angles to the axis of rotation. Each cutter 84 is provided at its lowermost portion with a lowermost knife-edge to rotate in the lowermost bounding plane. The vertical adjustment of the shaft 51 by the hand wheel 52 is indicated by the two-headed arrow 89 (Fig. 4), and the adjustment for operation is such that the lowermost bounding plane containing the said knife edges is brought to the perforated plate 73 so that the knife-edges skim along the surface of the plate as best shown in Fig. 6, with or without a pressure between them, which pressure is controlled by adjusting the hand wheel 52.

The cutters 84 are preferably made by machining bar stock. Each piece of bar stock, as a cutter 84, has a mountable end to lie over the knife-holder 78 and a free end projecting therefrom, which free end both cuts and propels. The free end is tapered outwardly from the upper part as shown toward the lower part having the said knife-edge over the plate 73. Because the cutters rotate at high speed, for example, 3000 r.p.m. in one model and 3600 r.p.m. in another, the taper offers numerous advantages. For one, the inertia is reduced. More importantly, however, the broadside-effect presented to material in the supply chamber 61 is reduced by the taper, thereby reducing the heat-producing swirling and centrifugal effects on the material in the chamber. Also, by reducing the broadside-effect by the taper, the free space above the cutters is enlarged for return of material from the periphery to the center for recirculation. Still another advantage is a shearing action when certain lugs are present as later described.

The mounted end of the cutter 84 is shown in cross-section in Fig. 5, which is substantially the cross-section of the bar stock from which it is made. Essentially, the bar has a first or rear face 90 and a second or forward face 91 generally angular to each other. For mechanical simplicity and convenience only, these faces are planes, and are at right angles to each other, wherefore the grooves 82 and 83 are right-angle grooves.

The normal junction of said faces 90 and 91 is cut away by a bottom or third face 92 (Fig. 7) which at the mounted end is preferably disposed so that it may rotate on the plate in the lowermost bounding plane of rotation, and which intersects the plane of forward face 91 in a straight line 93. Bottom face 92 is flat to facilitate drilling holes 94 (Fig. 7) for mounting the cutter. From the end of the portion having the cross-section shown in Fig. 5, the bar begins to taper outwardly and downwardly as mounted, a cross-section of the tapered portion being shown in Fig. 6 as it lies over the plate 73. In this free-end tapered region the forward face 91 is provided with a recess 95, of which the lower flat wall 96 terminates in a straight line which in a new cutter may be an extension of the line 93, in a manner to form an acute-angle cutting edge 97, which is a straight line as a result of the specific structure illustrated.

Figure 7:
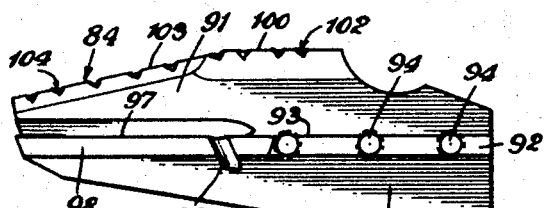
Fig. 7 is a view of the cutter of Figs. 3 to 6 looking directly at the underside as mounted in Fig. 4.

When the illustrated bottom face 92 of Fig. 7 is at equal angles with the faces 90 and 91, it will, if extended to the free end, run flat on the plate 73 as the cutting edge of a new cutter skims the face of the plate. Experience has shown that such an extended broad face 92 so running on the plate creates friction and unduly heats the material, not so much as a mass, but locally as a lubricating layer of material at the interface. To avoid this heating effect, and to lessen the drag on the motor by the friction, the said face 92 at the mounted end is not extended to the free end to form the knife-edge 97. Rather, the bar is slightly machined back from the knife-edge 97 forming a new face 98 (Figs. 6 and 7) which is raised from and inclined away from the plate 73 in operating position at an angle, one of 14° being satisfactory. The inclined face 98 back of the knife-edge 97 overlies the plate 73 and is preferably extended slightly into the mounting groove on cutter-head 78. This permits the cutter to be sharpened by grinding on face 98, thus raising the level thereof with reference to face 92 and forming a new knife-edge 97 at the intersection with wall 96 of recess 95. When the cutters are to be sharpened, the cutter-head 78 with the cutters mounted in it, is placed in a suitable grinder. To protect the rim of the cutter-head from contact with the grinding wheel, a notch 99 is formed into the cutter across knife-edge 97 partly within and partly without the said rim.

As the two cutters on one knife-holder 78 are provided with newly sharpened knife-edges 97 by removal of material, the cutter-head 78 must be correspondingly lowered with respect to plate 73 by adjusting the position of the shaft 51 by the hand wheel 52. The lowering of knife-head 78 into the plate 73 may be such that the bottom of grooves 82 and 83 lie below the level of the bottom of plate 73. Were the ends of the grooves beyond the cutters 84 open rather than closed as shown at 85 and 86 (Figs. 2 and 3), coarser particles than would pass plate 73 would find a channel via the groove into the pump chamber 55.

The cutter 84 also has a second and upper knife-edge uppermost of its mounted position and uppermost of the regions of forward face 91 which are most remote from the knife-edge 97 and bottom face 92. The upper knife-edge has a section 100 over the cutter-head as a sharpened edge between the face 91 and a top face 101 of the bar stock (Fig. 5). Said knife-edge 100 is parallel to the lower knife-edge 97, is hollow-ground on both faces, as shown with some exaggeration, and may be serrated as shown at 102 to give a sawing action. The upper knife-edge also has a portion 103 on the tapered free end of the cutter, and therefore, it angles toward the knife-edge 97. It likewise is hollow-ground and may be serrated as shown at 104. Rearwardly of knife-edge 103 is the face 105 tapering from bar face 101.

Figure 8:
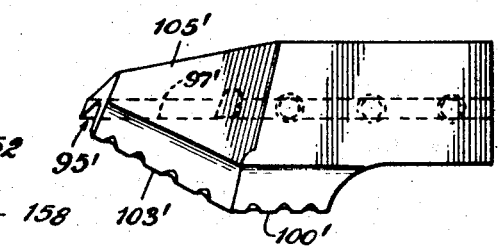
Fig. 8 is a modified form of cutter used in apparatus of smaller diameter than shown in Fig. 4.

Fig. 8 shows a modified and shorter cutter which is used with the same knife-holder 78, but in a machine having a smaller diameter of perforated plate and supply chamber. As shown, it is made of the same bar stock as the longer cutter of Fig. 7. The cutting end is shorter resulting in a shorter lower knife-edge 97', a shorter upper-knife portion 100', a shorter upper-knife portion 103' at a greater angle to portion 100', a more sloping tapered face 105', and a shorter recess 95'.

The machine as illustrated has other features which add to the efficiency of the machine using the cutters of the present invention.

For example, the housing 60 enlarges near its bottom to form a terminal upwardly tapering frusto-conical wall section 107, above a terminal supporting flange 69 (Fig. 4) which fits over the packing ring or seal 62, thus to exclude air from the chamber by possible suction from below the plate, as later described, and thus to avoid the danger of air being emulsified into the composition.

The frusto-conical section 107 (Fig. 4) is spaced an appreciable distance above the path of upper knife-edge 103 in order to provide a space over the cutter for flowing material to move up and out of the path of the cutter and be baffled back toward the center by the sloping ceiling 108.

Figure 2:
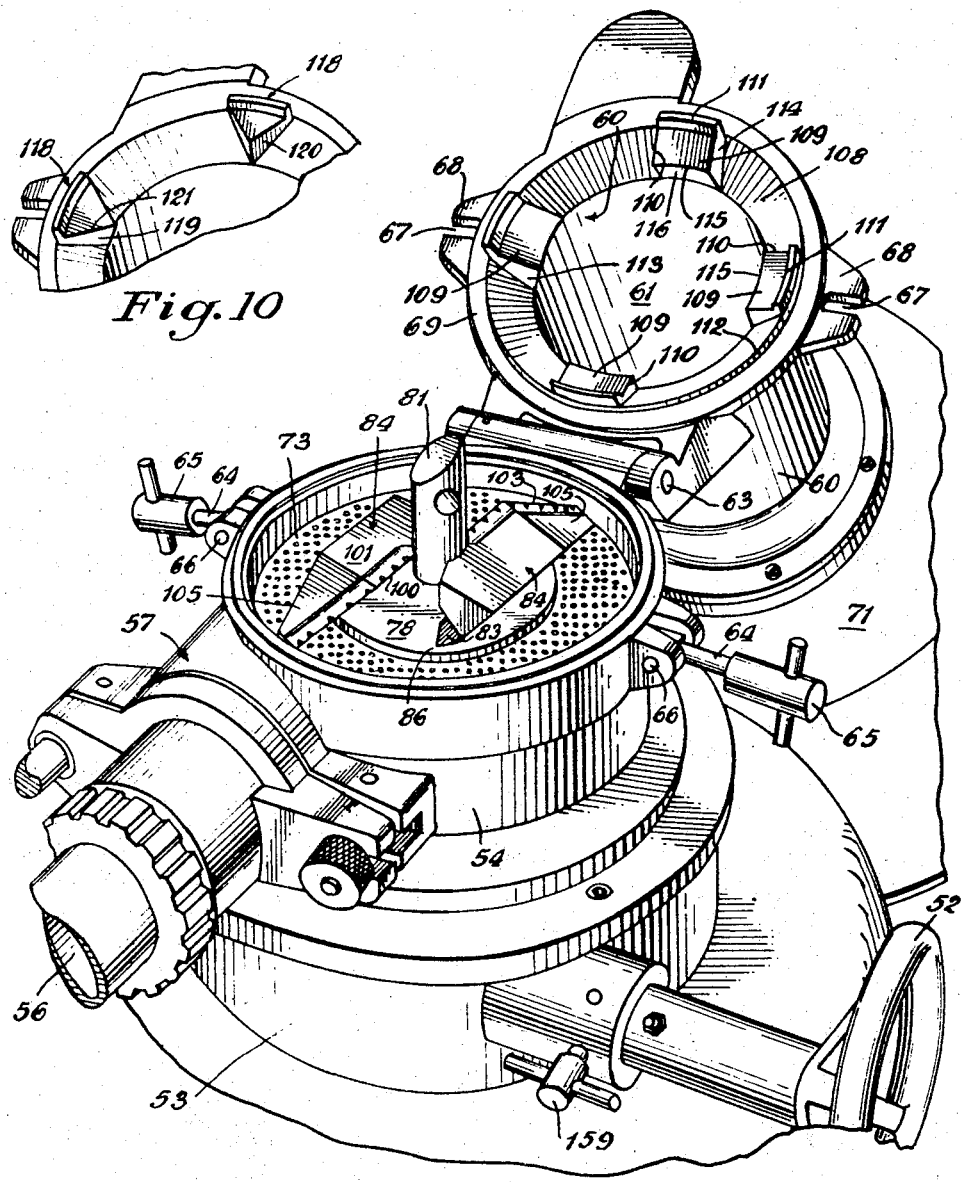
Fig. 2 is a perspective enlarged view of a portion of the machine opened for assembling certain parts.

Further, to minimize circulation and hence heating, lugs 109 may be provided projecting from sloping face 108 inwardly over the path of cutters 84. These lugs in the form as shown in Fig. 2 abruptly stop spiral circulation and cause quick return of flowing material toward the center. Lugs 109 preferably have lower side edges 110 positioned for shearing clearance with the cutter edges 103, so that large pieces in the path of the cutter are more quickly cut. Lugs 109 have arcuate flange portions 111 fitting inside of the housing 54 to insure proper fitting of housings 54 and 60 and to shear material at the tips of cutters 84. The upper portions of flanges 111 are part of a peripheral ridge 112 just inside housing 54. The annular space between the housing 54 and the path of rotation of the tips of the cutters provides a channel in which material centrifugally brought to the wall of housing 54 may move upwardly between lugs to the sloping ceiling 108 for return toward the center.

The angle between each lug edge 110 and the knife-edge 103 may be varied both by the angle of the knife-edge with respect to the radial direction, and by the form of the lug. The form of the lug controls the positions and areas of its faces, and hence the deflecting action of those faces on the swirling and down-feeding contents.

The lugs 109 as shown have parallel side faces 113 and 114 (rear lug in Fig. 4) and a substantial width, corresponding to an arc of about 20° at the periphery of plate 73. In proportion to the width is the shearing action of the knife-edge 103 as it passes arcuate front edge 115 of the lugs at a slight angle in which to engage pieces to be cut. The angles of the knife-edge 103 with the shearing edges 110 and 115 of the lugs 109 are readily observed at the right hand lug in Fig. 3 showing the position of the lug in dotted lines. By reason of the lug form as shown, the inward face 116, extending between the shearing edge 115 and the periphery of the smaller base of the frusto-conical section 107, provides an inwardly sloping baffle for material coming down the wall of the supply chamber 61.

Figure 10:
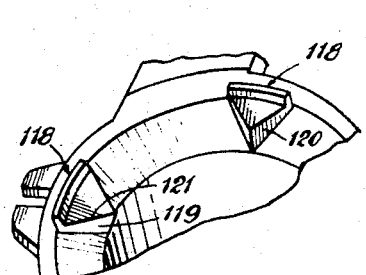
Fig. 10 is a fragmentary view similar to a portion of Fig. 2 showing a modified lug.

As shown the shearing between knife-edge 103 and the side edges 110 of the lugs 109 takes place outwardly as the cutter rotates (see Fig. 3). By changing the angle of the near face 113 which meets the cutter, the shearing may be made to take place inwardly, and at the same time the modification of face 113 receives less impact from the swirling material, which results in less vibration. Fig. 10 shows a modified lug which is pointed, and it is to be understood that other forms of lug may be employed.

In Fig. 10, the modified lug does not offer advantage from the shearing edge 115 of lug 109 at the bottom of the broad inner face 116 shown in Fig. 2, and it loses much of the baffling effect of that face on down-feeding material.

Figure 11:
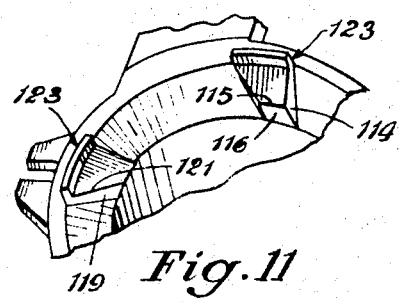
Fig. 11 is a view similar to that of Fig. 10 showing a second form of lug combining features of the lugs of Fig. 2 and Fig. 10.

Fig. 11 shows a modified lug one half of which is like the lug shown in Fig. 2 and the other half is like the lug shown in Fig. 10. Thus, the advantages of both forms are secured.

In Figs. 10 and 11, only the modified portions are newly designated. In Fig. 10 the tapered lug 118 has side faces 119 and 120 corresponding to parallel faces 113 and 114 of lugs 109, and provides shearing edge 121 at face 119 to shear with knife-edge 103, with which it forms an inwardly opening angle between the shearing edges, into which centrifugal force hurls the material.

In Fig. 11 the modified lug 123 retains the face 114 of lug 109, a vertical half of face 116, and half of shearing edge 115 of lug 109. Lug 123 has the face 119 and its edge 121 of the lug in Fig. 10 to effect initial shearing at the lug and angularly to baffle material toward the center.

When the machine operates at 3600 r.p.m. with four lugs and two cutters as shown, there are 28,800 shearing actions per minute, which greatly contribute to the speed of comminution, to the reduction in circulation of material awaiting final comminution and passage through the plate, and hence, to a reduction in the generation of heat by circulation and friction.

Although the mounted cutters in high-speed rotation cause their forwardly inclined faces 91 between the knife-edges 97 and 103 to function as propeller blades, it is preferred to enhance the forces causing passage of material into and out of the machine. One means to this end is a centrifugal pump having an ejection rotor in ejection chamber 55, under plate 73 (Fig. 4). The preferred rotor 125 is generally diamond-shaped as shown in dotted outline in Fig. 3, and in cross-section in Fig. 4, which rotor removes material from the underside of plate 73 and forces it by centrifugal pump action to the periphery of chamber 55 for discharge through outlet 57 into spout 56. Rotor 125 supports knife-holder 78 at a peripheral lip 126 on the underside. Rotor 125 is fixed to the shaft 51 by a key 127 in the shaft and in key-slot 128 in the rotor. The top face 129 of rotor 125 is spaced away from the underside of plate 73, whereby the shaft 51 with the rotor 125 and knife-holder 78 may be raised from the position shown. The lower face 130 of rotor 125 is raised from the floor of chamber 55 so that the shaft 51 may be lowered, as the cutters are sharpened from the form shown.

The housing 53 (Fig. 4) is separate from the housing 54, and contains the adjusting mechanism. Shaft 51 runs free in an opening in a collar 132 at the top of housing 53. When the hereinafter-described seal at the bottom of chamber 55 is absent, it is desirable to protect the adjusting mechanism from possible contact with material from the ejection chamber 55, especially leaking brine from the curing salt. This is done by a rotary canopy or flinger plate 133 resting on shoulder 134 of the shaft 51 and keyed at 135 to shaft 51 in a collar portion 138 which runs free within a collar 139 forming part of housing 54. The ejection rotor 125 is supported by collar 138 on the flinger plate. Thus, top nut 81 clamps between it and flinger plate 133, the knife-holder 78 and the rotor 125.

Heretofore, it has been known to admit air into an ejection chamber such as 55 in the vicinity of the rotor shaft bearing a centrifugal pump rotor, whereby the suction effect draws in air and the air assists in ejection of material. It has been found that such admission of air is disadvantageous. It mixes air bubbles into the discharged material which is not only oxidizing in effect on meat, but also troublesome in using the mass for sausage and like encased meats. Air bubbles lead to fat and jelly pockets in encased or other forms of comminuted meats. By eliminating air bubbles more compact products are obtained, and less casing is required per unit weight of meat, such casings being an important item in cost. In addition, the admission of air into chamber 55 lessens the suction effect of the rotor 125 on material above the perforated plate, thus increasing the time for material to pass through the machine, and hence increasing the time for circulation and consequent heating.

To avoid these disadvantages and to secure important advantages, the ejection chamber 55 is sealed except for exposure to the underside of plate 78 and for exposure to the outlet 57 for spout 56.

Fig. 4 shows a suitable seal positioned to exclude entry of air at the shaft 51. Because the shaft is vertically adjustable the seal is made expansible and compressible, when it functions between the floor 140 of the ejection chamber 55 and the underside of rotor 125.

Figure 9:
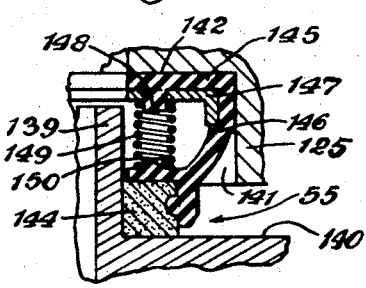
Fig. 9 is an enlarged fragmentary view in cross-section of that portion of Fig. 4 which shows a seal.

From the floor 140 the said upstanding annular collar 139 spaced away from the shaft 51 extends into a rightangular recess 141 (see Fig. 9) in rotor 125, which recess has a face 142 parallel with floor 140 and perpendicular to the axis of shaft 51. A ring seal is located between face 142 and floor 140.

The ring seal (Fig. 9) comprises a graphite ring 144 which runs on floor 140, and a flexible resilient casing of rubber or like material of which an annular face portion 145 contacts face 142. The casing extend downwardly and inwardly by portion 146 which at it end is forked in cross-section to enclose and carry graphite ring 144. At the inside junction of casing portions 145 and 146 is an annular flanged metal ring 147 having holes through and beyond which project small integral extensions 148 of the casing face portion 145. These extensions enter and position ends of compression springs 149 of which the other ends likewise receive projections 150 from the casing section 146. The springs 149 render the seal resilient, and the flexible resilient casing portion 146 keeps the space sealed.

The ring seal is a removable unit, easily replaced. Its effectiveness is evidenced by the fact that operations without it greatly reduce the load on the motor.

The remainder of the machine as shown in Fig. 4 may vary in construction from the arrangement shown. It includes means to adjust the shaft 51 vertically to position the cutters properly on the plate. In the machine as shown such means is placed as near as mechanically practicable to the cutters and plate. Because the portion of the shaft within the motor is heated and cooled, as the motor is run and idled, such portion changes in length. In order that this change is not so transmitted as to change the adjustment during an operation, the adjusting means is above the motor which is lowermost in the machine.

Housing 53 (Fig. 4) has an inner collar portion 152 with an internally threaded opening concentric with shaft 51. A circular threaded box 153 is mounted in said opening. Box 153 at the top is secured by screws 154 to a ring gear 155 having teeth 156 meshing with a worm gear 157 on shaft 158, which carries handwheel 52. A hand-screw 159 is tightened to lock shaft 158 in an adjusted position.

The resulting vertical movement of box 153 moves the shaft 51. Within box 153 is a double ball-bearing structure with inner race portions rigid with shaft 51 and outer race portions rigid with box 153. Shaft 51 has a shoulder 160 on which rests a collar 161, which together with locking nuts 162 on a threaded portion 163 of shaft 51 clamps inner races 164 and 165 to move with the shaft. The outer and stationary races 166 and 167 are secured in box 153 in part by the ring gear 155, as shown. An oil seal is indicated at 168.

In operation, meat products to be comminuted are fed into the funnel 71. The machine must not be operated without material to be comminuted. Operation quickly lowers the level of material above plate 73, and the level is preferably maintained as high as possible in the funnel 71. The fleshy character of the material gives it a hydraulic head to supplement the propelling action of cutters 84 and the suction from the throw-out rotor 125, the suction being especially greater when the seal is in place. Because of the suction the packing 62 between housings 54 and 60 and the packing 72 between housing 60 and funnel 71, prevent the entry of air to form bubbles above the plate 78, and the ring seal prevents the entry of air below the plate 78. The propelling action of cutters 84 and the pumping action of rotor 125 create a pressure for discharge through spout 56, so that a conduit may be attached to convey the material to any desired location.

In operating a machine as described at 3600 r.p.m., in which the annular perforated plate has diameters of 9¾ and 4¾ inches, with perforations having a diameter of .055 inch, a mixture of meat products for producing frankfurters, for example, is processed at the rate of 275 lbs. per minute.

All of the features described in detail contribute to efficiency in rate of production and in quality, and it is to be understood that one or more may be omitted, with reference to practicing the invention particularly set out in the appended claims.

I claim:

1. Apparatus for comminuting food products comprising a container having a first reservoir portion, a second intermediate comminuting portion, and a third discharge portion, a perforated valve plate between said second and third portions having a cylindrical opening therein, supporting means fixed to said container positioning said plate fixedly against movement in the direction of said discharge portion and permitting removal of said plate in the opposite direction, a comminuting rotor comprising a hub portion and outwardly extending knife arms in operating position in contact with said plate in said comminuting portion, said hub portion having a cylindrical wall extending through said opening in the plate with running clearance and being axially movable therein, rotary drive means in said discharge portion concentric with said opening, said drive means passing through said discharge portion and said opening into said comminuting portion, threaded means on the reservoir side of said comminuting rotor cooperating with threaded means on said drive means axially to fix said hub portion to said drive means for driving said rotor, said drive means being axially movable to move said arms away from and onto said plate, whereby said hub portion moves axially in said opening, a discharge rotor in said discharge portion rotatably connected to said drive means, and adjusting means operatively associated with said drive means to move and fix the axial position of said drive means relative to said plate and effecting movement of said arms onto said plate with pressure to hold said plate fixed in position against said supporting means during operation.

2. Apparatus for comminuting food products comprising a container having a first reservoir portion, a second intermediate comminuting portion, and a third discharge portion, a perforated valve plate between said second and third portions having a cylindrical opening therein, a comminuting rotor comprising a hub portion and outwardly extending knife arms in operating position in contact with said plate in said comminuting portion, said hub portion having a cylindrical wall extending through said opening in the plate with running clearance and being axially movable therein, rotary drive means in said discharge portion concentric with said opening, said drive means passing through said discharge portion and said opening into said comminuting portion, a discharge rotor in said discharge portion fixedly carried by said drive means, said hub bearing in the axial direction on said discharge rotor, threaded means on the reservoir side of said comminuting rotor cooperating with threaded means on said drive means axially to clamp said comminuting rotor between said first-mentioned threaded means and said discharge rotor, said drive means being axially movable to move said arms away from and onto said plate, whereby said hub portion moves axially in said opening, and adjusting means operatively associated with said drive means to move and to fix the axial position of said drive means relative to said plate to position and to hold said arms on said plate during operation.

References Cited in the file of this patent

UNITED STATES PATENTS

| | | |
|---|---|---|
| 1,977,955 | Robinson | Oct. 23, 1934 |
| 2,159,670 | Neitzke | May 23, 1939 |
| 2,496,359 | Rymann | Feb. 7, 1950 |
| 2,594,250 | Tranbarger | Apr. 22, 1952 |
| 2,639,747 | Burn et al. | May 26, 1953 |
| 2,801,665 | Hortnagl | Aug. 6, 1957 |

FOREIGN PATENTS

| | | |
|---|---|---|
| 179,437 | Austria | Oct. 15, 1953 |
| 895,095 | Germany | Oct. 29, 1953 |
| 1,111,496 | France | Oct. 26, 1955 |